(12) United States Patent
Kulick, III

(10) Patent No.: US 6,752,921 B1
(45) Date of Patent: Jun. 22, 2004

(54) BIOREACTOR TANK INTERNALLY CHAMBERED TO SEQUENTIALLY PERFORM BIOLOGICAL TREATMENT AND MEMBRANE FILTRATION

(75) Inventor: Frank M. Kulick, III, Gaithersburg, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 28 days.

(21) Appl. No.: 10/263,287

(22) Filed: Sep. 25, 2002

(51) Int. Cl.[7] .............................. B01D 21/30; C02F 11/02
(52) U.S. Cl. ...................... 210/138; 210/143; 210/150; 210/151; 210/195.3; 210/220
(58) Field of Search .............................. 210/607, 609, 210/621, 623–625, 739, 787, 138, 143, 150–151, 194–195.3, 220, 620

Primary Examiner—Chester T. Barry
(74) Attorney, Agent, or Firm—Jacob Shuster

(57) ABSTRACT

Wastewater is delivered to a single tank of a bioreactor system to undergo biological treatment. After undergoing such biological treatment, the wastewater is centrifugally separated outside the tank into contaminated portions with lowered and increased concentration of solids therein to respectively undergo filtration within a small volume chamber of the tank and continuous return to a large volume chamber for biological retreatment during operation of the bioreactor system. Under different conditions of the wastewater delivered to the tank, one of the separated portions of the biologically treated wastewater is disposed of by direct discharge in by-pass relation to the small chamber when delivery thereof into the small chamber is interrupted under selective valve control.

10 Claims, 1 Drawing Sheet

BIOREACTOR TANK INTERNALLY CHAMBERED TO SEQUENTIALLY PERFORM BIOLOGICAL TREATMENT AND MEMBRANE FILTRATION

STATEMENT OF GOVERNMENT INTEREST

The invention described herein may be manufactured and used by or for the Government of the United States of America for governmental purposes without the payment of any royalties thereon or therefore.

The present invention relates generally to bioreactor processing within a tank, involving filtration through membranes after biological treatment to remove solid contaminants.

BACKGROUND OF THE INVENTION

Membrane bioreactor systems have been utilized on-board commercial vessels to treat influent waste such as wastewater derived from various sources so as to: (a) eliminate perturbations in flow and temperature, (b) reduce biochemical oxygen demand, (c) reduce total suspended contaminating solids and (d) reduce fecal coliform concentration. Such systems involve collection of raw, non-oily wastewater fed into a tank for processing by membrane filtration and biological treatment to induce growth of the aerobic bacteria therein, promoted by aeration and carbon dissolved in the wastewater embodied in the solids carried therein. The wastewater so processed is withdrawn with reductions in biological oxygen demand, total suspended solids, and fecal coliform concentrations.

The maximum organic and hydraulic load capability of such bioreactor systems is limited by size of bioreactor tanks, concentration of contaminating solids within the wastewater being processed and the number of membranes through which permeate filtration is performed. While performing filtration on wastewater with or near the maximum allowable solids concentration therein, in a bioreactor system having a reduced size for shipboard installation, fouling of the membranes associated therewith increases so as to limit their operational life and require frequent cleaning and/or replacement. It is therefore an important object of the present invention to reduce temporary and permanent fouling of the membranes associated with such bioreactor systems so as to provide a more viable processing method, especially on-board sea vessels having limited installation space.

SUMMARY OF THE INVENTION

In accordance with the present invention, a single tank is utilized in a bioreactor system, internally partitioned into a volumetrically large chamber within which biological treatment of a wastewater contaminated by solids suspended therein, is continuously performed, and a volumetrically small chamber within which membrane filtration is performed after the wastewater collected within the small chamber undergoes separation between portions thereof by a dewatering device, located outside of the tank. Separation of such portions of the wastewater respectively increases and lowers contamination so that the portion with lowered contamination may undergo filtration into a cleansed effluent to be withdrawn, reflective of maximized removal of suspended solids during processing of wastewater contaminated under different conditions. Selectively controlled valve means is associated with the system in order to interrupt membrane filtration performed within the small chamber of the lank, while the separated portion with increased contamination is continuously recycled into the large chamber for biological retreatment. Also, some of the separated portion of the wastewater with the lowered contamination is disposed of by direct discharge from the dewatering device in by-pass relation to the tank, when the contamination condition does not require membrane filtration.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
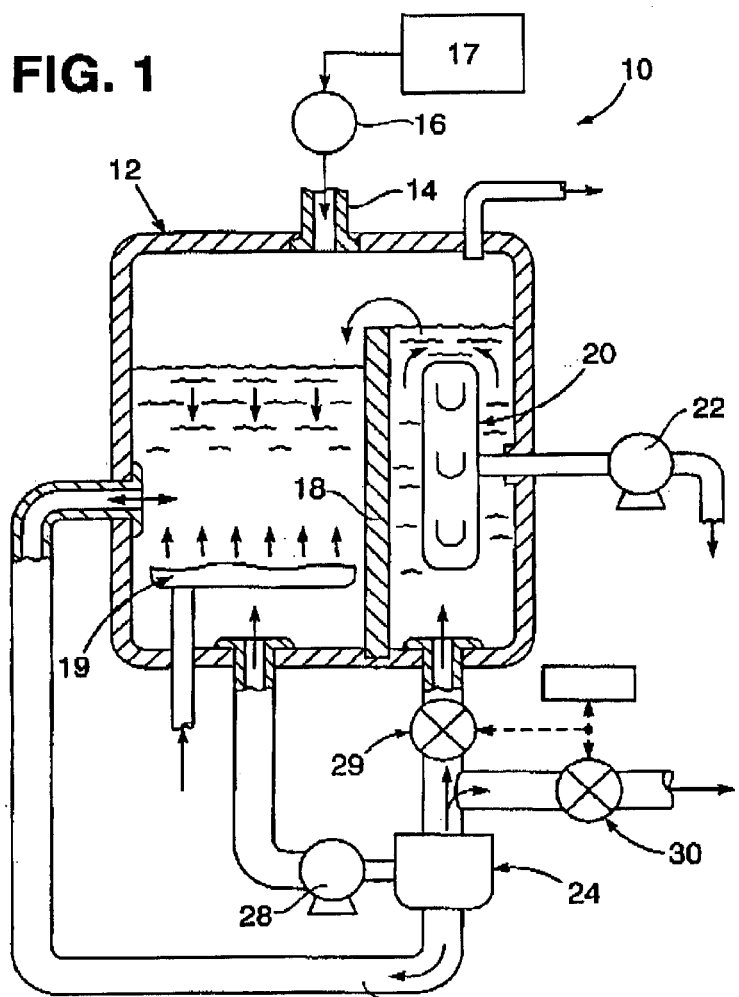
FIG. 1 is a cross-sectional view and diagrammatic illustration of a bioreactor system in accordance with one embodiment of the present invention.

Referring now to the drawing in detail, apparatus of a bioreactor system 10 is illustrated in FIG. 1, involving use of a single collection tank 12 to which a contaminated fluent biomass, such as raw feed streams of non-oily wastewater, is fed through an inlet 14 under pressure of a pump 16 from sources 17, such as showers, sinks, toilets and urinals on-board a sea vessel within which the system 10 may be installed. Such wastewater feed streams enter the top of the tank 12 for collection therein on opposite sides of a weir plate 18 internally partitioning the tank 12 into a volumetrically smaller chamber enclosing an assembly 20 of membranes immersed within wastewater having its contamination lowered and a larger volume chamber within which aeration by an aerator 19 promotes biological treatment. The wastewater with a lowered concentration of contamination solids inside the smaller chamber is filtered by permeation through the membranes of the assembly 20, under suction applied by a pump 22, to withdraw a permeate as a cleansed effluent, having substantially little or no contaminating solids therein. Biologically treated wastewater is recycled under pressure of a pump 28 from the larger chamber into the smaller chamber through a dewatering device 24, from which a portion of the wastewater with the solids concentration lowered is separated from another portion with an increased solid concentration as a result of centrifugation. The pump 28 withdraws the biologically treated wastewater from the bottom of the larger volume chamber of the tank 12 underlying an aerator 19, so as to recycle the biologically treated wastewater along a path outside the tank 12 through the dewatering device 24 for delivery of the separated portion thereof with the lowered solids concentration through a valve 29 into the smaller volume chamber of the tank 12, within which it undergoes membrane permeation. The wastewater portion having the increased solids concentration separated by the dewatering device 24 from the lowered solids concentrated wastewater portion, is continuously returned through a recycling conduit 26 from the dewatering device 24 into the larger volume chamber so as to elevate the suspended solids concentration therein, which undergoes biological retreatment. The wastewater undergoing such recycling, is maintained at a surface level within the larger chamber lower than that in the smaller volume chamber, from which the wastewater overflows the weir plate 18 into the larger volume chamber. By the membrane permeate filtration within the smaller tank chamber, the solids are finely separated therein, and withdrawn therefrom by the pump 22. The in-feed flow rate of wastewater into the tank 12 allows the aforementioned overflow of the wastewater into the larger volume chamber, within which the wastewater surface level is maintained at a lower level below the top of the weir plate 18, as shown in FIG. 1. By virtue of aeration within the larger volume chamber of the tank 12, aerobic bacterial growth is promoted during biological treatment so as to enhance the permeation through the membranes in the assembly 20 to more fully cleanse the wastewater being withdrawn by pump 22 as an effluent.

The contamination of the wastewater to be processed, will depend upon the condition of the seawater through which a sea vessel travels, when the bioreactor system 10 is installed therein. With the seawater under restricted or regulated conditions during location of the sea vessel near shore for example, processing may not require or call for membrane filtration. Since processing by the bioreactor system 10 involves exposure of the wastewater after biological treatment in the large chamber to ultraviolet radiation, system size and lank volume requirements are thereby reduced while successfully processing wastewater contaminated by a high solids concentration within the tank 12. Also, clarification of the collected wastewater at its expected and achievable delivery inflow rate into the tank 12, will be dependent upon the number of membranes within the assembly 20, which may accordingly be selected in order to accommodate needs such as the size of a crew on-board the sea vessel.

Because of the aforesaid lowering of solids concentration of a separated portion of the wastewater during passage through the dewatering device 24, the other separated portion of the wastewater with increased solids concentration is recycled into the large chamber to undergo biological retreatment. Membrane permeation within the small chamber is thereby enhanced under certain contamination conditions of the wastewater delivered to the system 10. The recycling of wastewater into the small chamber is interrupted under selective control as hereinafter explained, when filtration is not required so as to reduce membrane fouling within the assembly 20 and thereby prolong its operational life.

While a sea vessel within which the bioreactor system 10 is installed is being propelled through seawater under the aforementioned conditions that do not require solids separation by the membrane assembly 20 in order to sufficiently cleanse the wastewater, the aforesaid interruption in filtration is achieved by closure of the valve 29 so as to operationally isolate the small membrane chamber, while discharge valve 30 is opened for direct compact disposal of the separated waste sludge portion of the wastewater from the dewatering device 24 otherwise delivered to the small chamber.

In accordance with functioning of a dewatering device as generally known in the art, the aforementioned centrifigation is performed within the dewatering device 24 so as to separate the biologically treated wastewater into the two aforementioned portions, one of which has its solids concentration lowered by passage through a decanter, disk and vane-type centrifuge usually associated with dewatering devices. According to another embodiment, separation of the wastewater into the two portions involves use of dissolved air floatation by lift of solids under pressure of wastewater in-feed and aeration injection, followed by a release of tiny air bubbles adhering to the solids in response to a drop in pressure. The solids are thereby carried in bubbles to the top surface of the wastewater within the smaller in-tank chamber to overflow the weir plate 18 into the collected wastewater within the larger volume chamber of the tank 12, maintained at its lower surface level during operation of the bioreactor system 10.

Figure 2:
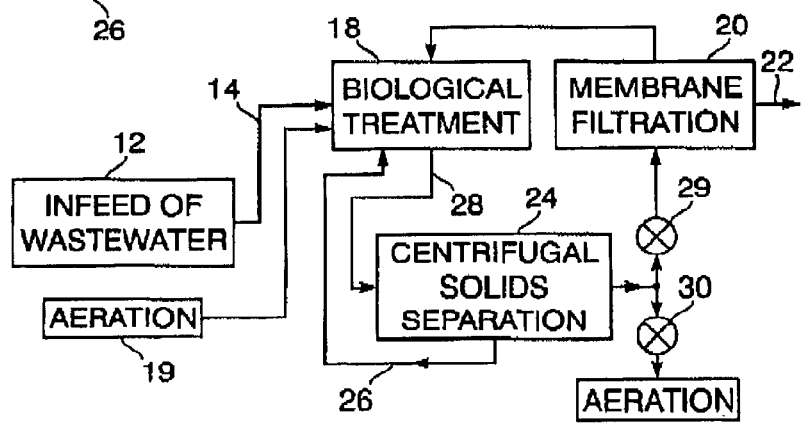
FIG. 2 is a block diagram summarizing the wastewater processing method performed by the apparatus illustrated in FIG. 1.

The bioreactor processing method associated with the apparatus of the bioreactor system 10, as illustrated in FIG. 1 and summarized diagrammatically in FIG. 2, involves infeed of the wastewater from the sources 17 by the pump 16 through the inlet 14 into the larger volume chamber of the tank 12 for biological treatment, after which it is recycled by the pump 28 through the dewatering device 24 to change contaminating concentration of solids by separation of the wastewater into portions thereof that are respectively returned with increased solids concentration therein into the larger volume chamber through the conduit 26 for biological retreatment, and under selective control through the valve 29 the portion with lowered solids concentration is delivered into the smaller chamber so as to undergo membrane filtration. Under certain contamination conditions of the wastewater being collected in the tank 12, that do not require membrane filtration, the separated portions of the wastewater are respectively returned to the large volume chamber for continued biological retreatment, and discharged directly in by-pass relation to the small volume chamber through the opened valve 30 for disposal.

Obviously, other modifications and variations of the present invention may be possible in light of the foregoing teachings. It is therefore to be understood that within the scope of the appended claims the invention may be practiced otherwise than as specifically described.

What is claimed is:

1. A bioreactor system for biological treatment and membrane filtration of a biomass within a tank, the improvement residing in: means for internally partitioning the tank into volumetrically small and large chambers; positioning means for confining said filtration to the small chamber; means for separating the biomass into portions respectively having increased and lowered concentration of solids therein after undergoing said biological treatment within the large chamber; and recycling means for respective delivery of said separated portions of the biologically treated biomass into the small chamber to undergo said filtration and into the large chamber to undergo biological retreatment.

2. The bioreactor system is defined in claim 1, including selective control means for disposal of one of the separated portions of the biologically treated biomass by direct discharge in by-pass relation to the tank while interrupting said delivery thereof into the small chamber by operational isolation to prevent said filtration.

3. The bioreactor system as defined in claim 2, wherein said means for separating comprises: a centrifuge dewatering device interconnecting the tank and the recycling means externally of the tank; and transfer pump means for supply of the biologically treated biomass from the large chamber of the tank under pressure to the dewatering device.

4. The bioreactor system as defined in claim 3, wherein said one of the separated portions of the biomass having the lowered concentration of solids undergoes said filtration within the small chamber of the tank, while the other of said portions is recycled into the large chamber.

5. The bioreactor system as defined in claim 1, wherein the biomass is wastewater contaminated by said concentration of solids therein.

6. The bioreactor system as defined in claim 1, wherein said means for separating the wastewater into the portions comprises: a centrifuge dewatering device connected to the recycling means externally of the tank; and transfer pump means for supply of the biologically treated biomass from the large chamber of the tank under pressure to the dewatering device.

7. The bioreactor system as defined in claim 1, wherein said one of the separated portions of the biomass undergoing said filtration within the small chamber of the tank has said lowered concentration of solids therein, while the other of said portions recycled into the large chamber has the increased concentration of solids therein.

8. A bioreactor system within which wastewater having contamination therein is processed, comprising: a tank within which the wastewater is collected; partitioning means for internally dividing the tank into volumetrically smaller and larger chambers; means for continuous biological treatment of the collected wastewater within the larger chamber during operation of the bioreactor system; means for recycling the collected wastewater between the chambers during said biological treatment thereof; membrane means for performance of filtration during said recycling of the collected wastewater within the tank: dewatering means located outside the tank for separation of the wastewater into a portion with the contamination increased and continuously returned to the tank and a portion with the contamination lowered; said membrane means being positioned inside the smaller chamber of the tank within which the wastewater undergoes said filtration into a cleansed effluent withdrawn from the bioreactor system; said means for recycling of the wastewater involving continuous overflow of the wastewater within the tank from the smaller chamber into the larger chamber, and passage into the smaller chamber from the larger chamber through the dewatering means from which the portion with the lowered contamination undergoes delivery into the smaller chamber or disposal in by-pass relation thereto; and selectively controlled valve means for interrupting either said delivery into the smaller chamber or said disposal from the bioreactor system.

9. A bioreactor system through which wastewater with contamination therein is processed, comprising: a tank internally divided into volumetrically large and small chambers; means for biologically treating the wastewater collected within the large chamber of the tank during operation of the bioreactor system; means for recycling the biologically treated wastewater within the tank, involving overflow of the wastewater between the chambers inside the tank and passage thereof between the chambers outside the tank; dewatering means located outside the tank for separation of the biologically treated wastewater undergoing said recycling passage outside the tank into portions having the contamination therein respectively increased and lowered; conduit means located outside the tank (or continuous return of one of the separated portions of the biologically treated wastewater with the increased contamination from the dewatering means into the tank; membrane means for filtration of the other of the separated portions of the wastewater into a cleansed effluent; and selectively controlled valve means for either interrupting delivery of the separated portion of the wastewater with the lowered contamination into the small chamber or disposal thereof by direct discharge from the dewatering means in by-pass relation to the tank when said delivery to the small chamber is interrupted.

10. The bioreactor system as defined in claim 9, wherein said overflow of the wastewater inside the tank enters the large chamber maintained at a lower surface level; the membrane means being located inside the small chamber of the tank so that the separated portion of the wastewater with the lowered contamination from the dewatering means undergoes said filtration by the membrane means into the cleansed effluent to be withdrawn from the small chamber while said conduit means continuously returns said one of the separated portions of the wastewater with the increased contamination to the large chamber.

\* \* \* \* \*